US009170733B2

(12) United States Patent
Komoda et al.

(10) Patent No.: US 9,170,733 B2
(45) Date of Patent: Oct. 27, 2015

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Minato-ku, Tokyo (JP)

(72) Inventors: Toshiyuki Komoda, Kanagawa (JP); Naoki Okamoto, Kanagawa (JP); Takeshi Kunimasa, Kanagawa (JP); Yoshihisa Matsuo, Kanagawa (JP); Takenori Matsuo, Kanagawa (JP); Norihiro Wada, Kanagawa (JP); Koji Bito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 80 days.

(21) Appl. No.: 13/903,417

(22) Filed: May 28, 2013

(65) Prior Publication Data

US 2014/0152589 A1 Jun. 5, 2014

(30) Foreign Application Priority Data

Dec. 5, 2012 (JP) .................................. 2012-266792

(51) Int. Cl.
*G06F 3/0488* (2013.01)
*G06F 3/0354* (2013.01)
*G06F 3/041* (2006.01)
*G06F 3/047* (2006.01)

(52) U.S. Cl.
CPC ........ *G06F 3/04883* (2013.01); *G06F 3/03547* (2013.01); *G06F 3/047* (2013.01); *G06F 3/0412* (2013.01); *G06F 3/0414* (2013.01); *G06F 2203/04808* (2013.01)

(58) Field of Classification Search
USPC .......................................................... 345/173
See application file for complete search history.

(56) References Cited

U.S. PATENT DOCUMENTS

| 8,451,248 B1* | 5/2013 | Kim ............................... 345/173 |
| 2010/0011282 A1* | 1/2010 | Dollard et al. ................ 715/233 |
| 2010/0060588 A1* | 3/2010 | Fong ............................. 345/173 |
| 2011/0063234 A1* | 3/2011 | Liu ................................ 345/173 |

(Continued)

FOREIGN PATENT DOCUMENTS

| JP | 7-175587 A | 7/1995 |
| JP | 2000-222130 A | 8/2000 |
| JP | 2006-139615 A | 6/2006 |

*Primary Examiner* — Jason Olson
*Assistant Examiner* — Deeprose Subedi
(74) *Attorney, Agent, or Firm* — Sughrue Mion, PLLC

(57) ABSTRACT

An information processing apparatus includes a display, a detector, a display controller, a display region changing unit, and an editing execution unit. The detector detects plural touches made by an indicator on a screen of the display. The display controller causes the screen to display a first element and a second element, the second element being arranged on the first element. The display region changing unit changes, if a predetermined type of change occurs in a touch position of the indicator, a display region in which the first element and the second element are displayed on the screen, in accordance with the change. The editing execution unit executes, after a first touch position and a second touch position have been detected, if a predetermined type of change occurs in the second touch position with the first touch position being maintained, editing associated with the change on the second element.

7 Claims, 13 Drawing Sheets

(56) References Cited

U.S. PATENT DOCUMENTS

| | | | |
|---|---|---|---|
| 2011/0194135 A1* | 8/2011 | Hamilton et al. | 358/1.14 |
| 2012/0062489 A1* | 3/2012 | Andersson et al. | 345/173 |
| 2012/0086652 A1* | 4/2012 | Kim et al. | 345/173 |
| 2013/0097481 A1* | 4/2013 | Kotler et al. | 715/230 |
| 2013/0097490 A1* | 4/2013 | Kotler et al. | 715/255 |
| 2013/0111334 A1* | 5/2013 | Liang et al. | 715/252 |
| 2013/0191720 A1* | 7/2013 | Simons et al. | 715/234 |
| 2014/0075302 A1* | 3/2014 | Akashi | 715/268 |

\* cited by examiner

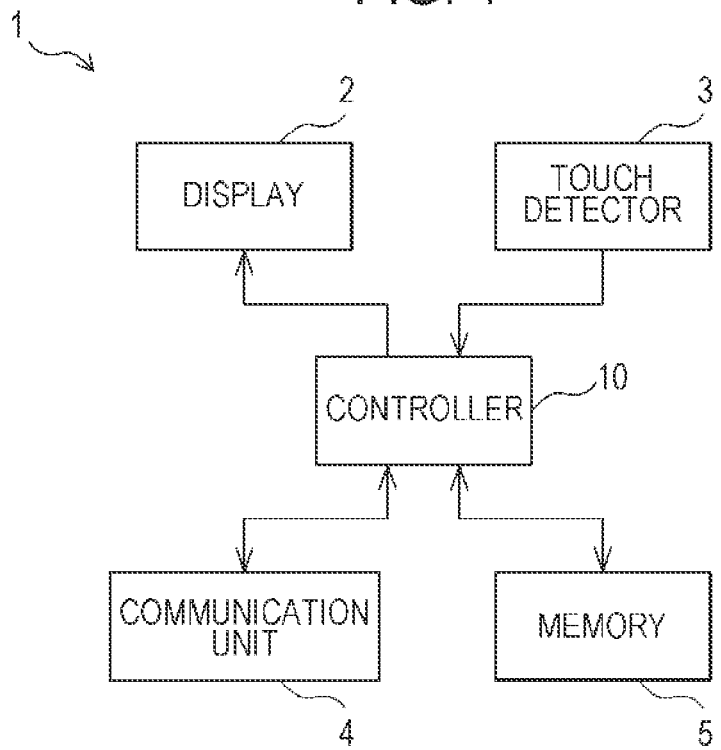

| ANNOTATION NUMBER | ANNOTATION DATA | TARGET PAGE | ANNOTATION COORDINATES |
|---|---|---|---|
| A0001 | A0001dat | P0001 | X1, Y1 |
| A0002 | A0002dat | P0002 | X2, Y2 |
| A0003 | A0003dat | P0002 | X3, Y3 |
| A0004 | A0004dat | P0003 | X4, Y4 |
| A0005 | A0005dat | P0005 | X5, Y5 |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-266792 filed Dec. 5, 2012.

BACKGROUND

Technical Field

The present invention relates to an information processing apparatus, an information processing method, and a non-transitory computer readable medium.

SUMMARY

According to an aspect of the invention, there is provided an information processing apparatus including a display, a detector, a display controller, a display region changing unit, and an editing execution unit. The detector detects plural touches made by an indicator on a screen of the display. The display controller causes the screen to display a first element and a second element, the second element being arranged on the first element. The display region changing unit changes, if a predetermined type of change occurs in a touch position of the indicator, a display region in which the first element and the second element are displayed on the screen, in accordance with the change. The editing execution unit executes, after a first touch position and a second touch position have been detected, if a predetermined type of change occurs in the second touch position with the first touch position being maintained, editing associated with the change on the second element. The editing includes moving of the second element on the first element.

BRIEF DESCRIPTION OF THE DRAWINGS

An exemplary embodiment of the present invention will be described in detail based on the following figures, wherein:

FIG. 1 is a diagram illustrating an example of the configuration of an information processing apparatus;

FIG. 2 is a diagram illustrating an example of a page database;

DETAILED DESCRIPTION

Figures 3, 4:
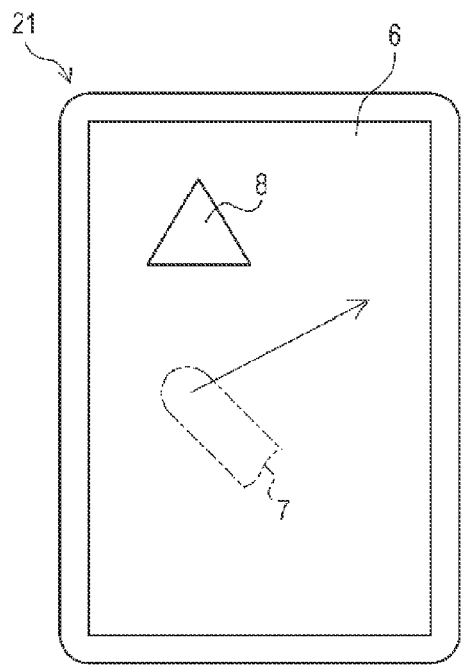
FIG. 3 is a diagram illustrating an example of an annotation database.
FIG. 4 is a diagram illustrating an example of display on a screen.

An information processing apparatus according to an exemplary embodiment of the present invention will be described with reference to the drawings.

FIG. 1 is a diagram illustrating an example of the configuration of an information processing apparatus 1. The information processing apparatus 1 includes a controller 10, a display 2, a touch detector 3, a communication unit 4, and a memory 5. The information processing apparatus 1 is implemented by, for example, a mobile information terminal such as a tablet computer.

The controller 10 includes, for example, a processing unit such as a central processing unit (CPU) and a memory such as a random access memory (RAM), and executes information processing in accordance with a program. The program may be provided via a computer-readable information storage medium, such as a compact disc read only memory (CD-ROM), or may be provided via a communication line such as the Internet.

The display 2 is, for example, a thin display such as a liquid crystal display or an organic electroluminescent (EL) display. The touch detector 3 is, for example, a touch panel provided on the screen of the display 2 in a superposing manner, and detects a touch (an example of a touch) made by a user's finger or a pen-like indicator such as a stylus in a detection region determined on the screen. Here, a "touch" includes not only a direct touch on the screen but also a state where a finger is slightly floating above the screen.

The communication unit 4 is a device used for communicating with another apparatus via a communication network. The communication unit 4 supplies data received from another apparatus to the controller 10, and transmits data received from the controller 10 to another apparatus.

The memory 5 is, for example, a solid state drive (SDD). The memory 5 is provided with databases accessible by the controller 10. The databases may be built in an apparatus different from the information processing apparatus 1.

The information processing apparatus 1 implements an electronic document viewing function and displays, on the screen of the display 2, a page object (an example of a first element) representing an electronic document and an annotation (an example of a second element) arranged on a page object. Also, the information processing apparatus 1 accepts, with the touch detector 3, an operation for scrolling or the like. Furthermore, the information processing apparatus 1 accepts, with the touch detector 3, an operation for editing an annotation. Editing of an annotation will be described in detail below.

Examples of the databases built in the memory 5 include a page database and an annotation database.

FIG. 2 is a diagram illustrating an example of the page database. The page database manages data of page objects in units of pages. The page database includes a "page number" field and a "page object data" field. The "page number" field shows page numbers, which serve as identification information about page objects. The "page object data" field shows the names of pieces of image data constituting page objects.

FIG. 3 is a diagram illustrating an example of the annotation database. The annotation database manages data of annotations arranged on page objects. The annotation database includes an "annotation number" field, an "annotation data" field, a "target page" field, and an "annotation coordinates" field. The "annotation number" field shows annotation numbers, which serve as identification information about annotations. The "annotation data" field shows the names of pieces of image data constituting annotations. The "target page" field shows the page numbers of page objects on which annotations are arranged. The "annotation coordinates" field shows the coordinates in which annotations are arranged.

Hereinafter, examples of display on a screen in the information processing apparatus 1 will be described.

FIG. 4 is a diagram illustrating an example of display on a screen, describing a change in a display region. On a screen 21, a page object 6 and an annotation 8 arranged thereon are displayed. When a user moves a finger 7 which is in touch with the screen 21 (a so-called scroll operation), a display region in which the page object 6 and the annotation 8 are displayed on the screen 21 slides in the moving direction of the finger 7. When the user moves the finger 7 which is in touch with the screen 21 at a speed higher than or equal to a threshold (a so-called swipe operation), the page object 6 displayed on the screen 21 is switched in such a manner that a page is turned. When the user moves two fingers 7 which are in touch with the screen 21 so as to change the distance between the two fingers 7 (a so-called pinch operation), the display region in which the page object 6 and the annotation 8 are displayed on the screen 21 is increased or decreased. In this way, when the user moves the finger 7 (or fingers 7) which is (are) in touch with the screen 21 in accordance with a predetermined pattern, the display region in which the page object 6 and the annotation 8 are displayed on the screen 21 is changed in accordance with the pattern. Hereinafter, an operation for changing the display region on the screen 21 is referred to as a "viewing operation". The predetermined pattern is, for example, a predetermined type of change in a touch position. Change in a touch position includes, for example, not only a movement of a direct touch on a screen, but also "tapping", which is an action of tapping a screen, and a movement of a finger slightly floating above a screen.

Figure 5:
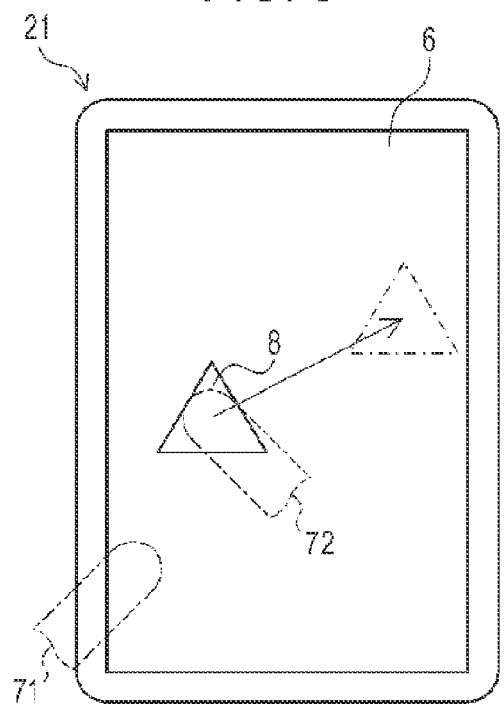
FIG. 5 is a diagram illustrating an example of display on the screen.
Figure 6:
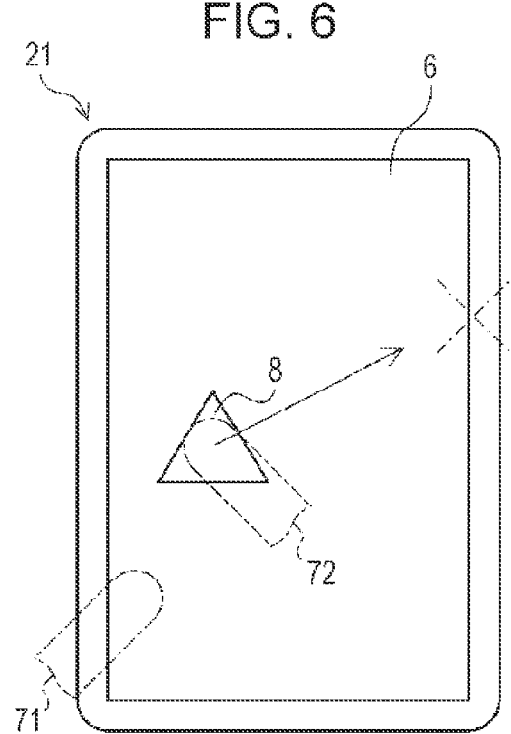
FIG. 6 is a diagram illustrating an example of display on the screen.
Figure 7:
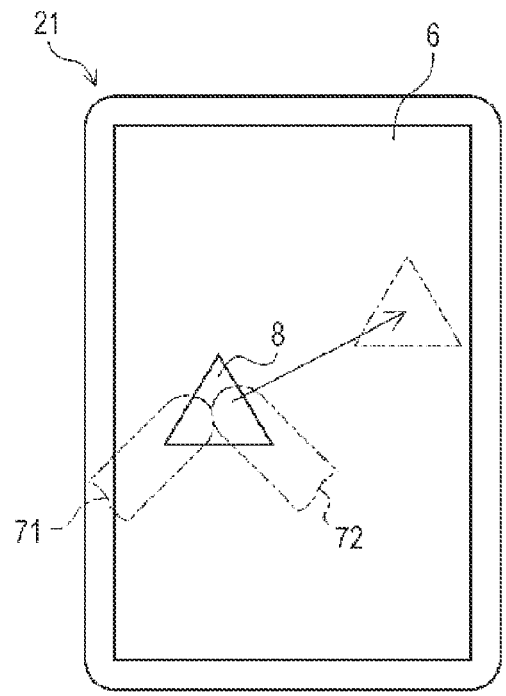
FIG. 7 is a diagram illustrating an example of display on the screen.

FIGS. 5 to 7 are diagrams illustrating examples of display on a screen, describing editing of the annotation 8. Editing of the annotation 8 is executed by the following operation. That is, a user touches the screen 21 with a first finger 71, and moves the touch position of a second finger 72 while maintaining the touch position of the first finger 71, thereby the annotation 8 is edited. The first finger 71 is a finger that touches the screen 21 first, and the second finger 72 is a finger that touches the screen 21 next. Hereinafter, an operation for editing the annotation 8 is referred to as an "editing operation".

FIG. 5 is a diagram describing movement of the annotation 8. Movement of the annotation 8 is executed by the following operation. That is, the user touches a portion other than the annotation 8 on the screen 21 (for example, a portion on the page object 6) with the first finger 71, and moves the touch position of the second finger 72 from a position on the annotation 8 to the outside of the annotation 8 while maintaining the touch position of the first finger 71. Accordingly, the annotation 8 is moved to the touch position of the second finger 72 which has moved.

FIG. 6 is a diagram describing deletion of the annotation 8. Deletion of the annotation 8 is executed by the following operation. That is, the user touches a portion other than the annotation 8 on the screen 21 (for example, a portion on the page object 6) with the first finger 71, and moves the touch position of the second finger 72 from a position on the annotation 8 to an edge of the screen 21 while maintaining the touch position of the first finger 71. Accordingly, the annotation 8 is deleted.

FIG. 7 is a diagram describing duplication of the annotation 8. Duplication of the annotation 8 is executed by the following operation. That is, the user touches the same annotation 8 with the first finger 71 and the second finger 72, and moves the touch position of the second finger 72 from a position on the annotation 8 to the outside of the annotation 8 while maintaining the touch position of the first finger 71. Accordingly, a duplicate of the annotation 8 is generated at the touch position of the second finger 72 which has moved.

In FIGS. 5 to 7, editing is stopped if the user moves the first finger 71 away from the screen 21 before editing of the annotation 8 is completed, for example, before movement of the touch position of the second finger 72 ends.

Hereinafter, a configuration for implementing display on a screen described above will be described.

Figure 8:
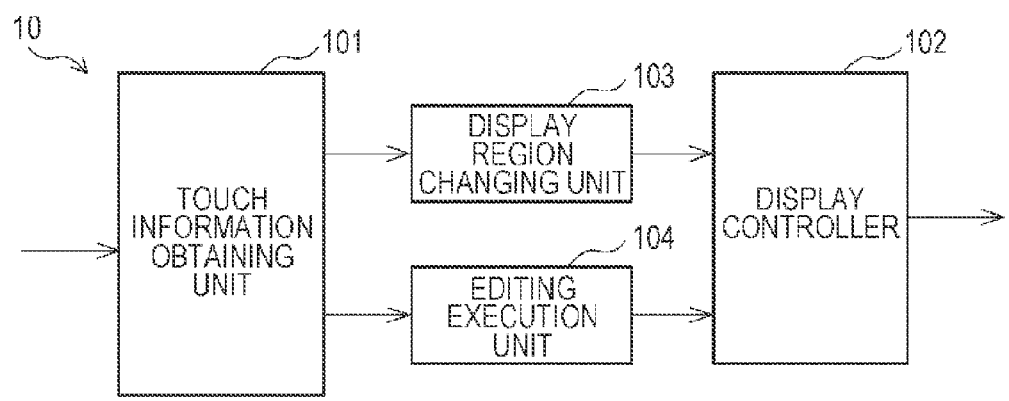
FIG. 8 is a diagram illustrating an example of the functional configuration of the information processing apparatus.

FIG. 8 is a diagram illustrating an example of the functional configuration of the information processing apparatus 1. FIG. 8 is a functional block diagram illustrating the functions related to an exemplary embodiment of the present invention among the functions implemented by the information processing apparatus 1. The controller 10 of the information processing apparatus 1 includes a touch information obtaining unit 101, a display controller 102, a display region changing unit 103, and an editing execution unit 104.

These units are implemented when the controller 10 of the information processing apparatus 1 executes processing in accordance with a program. The controller 10 is capable of accessing the page database and the annotation database built in the memory 5.

The touch information obtaining unit 101 obtains touch information detected by the touch detector 3. For example, the touch information obtaining unit 101 detects the occurrence of a swipe event in which a touch position moves at a speed higher than or equal to a threshold, the occurrence of a down event (the finger 7 is put on the screen 21), the occurrence of an up event (the finger 7 is moved away from the screen 21), the occurrence of a move event in which a touch position moves (except a swipe event), or the like.

The display controller 102 reads out the data of the page object 6 from the page database, reads out the data of the annotation 8 from the annotation database, and causes the screen 21 to display the page object 6 and the annotation 8.

Upon receiving touch information related to a viewing operation from the touch information obtaining unit 101, the display region changing unit 103 outputs, to the display controller 102, a display region change instruction to change a display region in which the page object 6 and the annotation 8 are displayed on the screen 21. Upon receiving the display region change instruction, the display controller 102 changes the display region in which the page object 6 and the annotation 8 are display on the screen 21.

Upon receiving touch information related to an editing operation from the touch information obtaining unit 101, the editing execution unit 104 edits the data of the annotation 8 stored in the annotation database, and outputs a display instruction corresponding to the details of the editing to the display controller 102.

For example, in a case where an editing operation for moving the annotation 8 is performed, the editing execution unit 104 changes the coordinates of the annotation 8 stored in the annotation database, and outputs a display instruction to display the moved annotation 8 to the display controller 102. Upon receiving the display instruction, the display controller 102 draws the annotation 8 at the specified position.

In a case where an editing operation for deleting the annotation 8 is performed, the editing execution unit 104 deletes the information about the annotation 8 stored in the annotation database, and outputs a display instruction to erase the annotation 8 from the screen 21 to the display controller 102. Upon receiving the display instruction, the display controller 102 stops drawing the annotation 8.

In a case where an editing operation for duplicating the annotation 8 is performed, the editing execution unit 104 newly stores the information about the annotation 8 which is duplicated in the annotation database, and outputs a display instruction to display the duplicated annotation 8 to the display controller 102. Upon receiving the display instruction, the display controller 102 draws the duplicated annotation 8.

Next, the operation of the information processing apparatus 1 will be described. FIGS. 9 to 18 are flowcharts illustrating examples of the operation of the information processing apparatus 1. The operation is executed when the controller 10 of the information processing apparatus 1 executes processing in accordance with a program.

Down Event Processing

Figure 9:
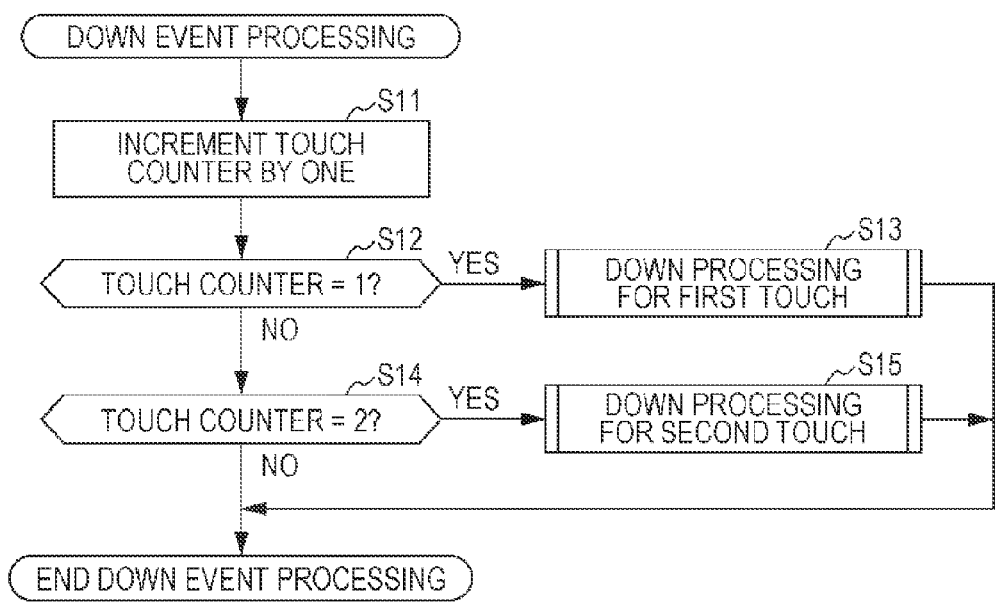
FIG. 9 is a flowchart illustrating an example of the operation of the information processing apparatus.

FIG. 9 is a flowchart illustrating an example of the operation of the information processing apparatus 1, describing down event processing. The controller 10 starts down event processing when a down event occurs.

In step S11, the controller 10 increments a touch counter by one. In step S12, the controller 10 determines whether or not the value of the touch counter is one. If the value of the touch counter is one (YES in step S12), the controller 10 proceeds to step S13, and executes down processing for the first touch, which will be described below. If the value of the touch counter is not one (NO in step S12), the controller 10 proceeds to step S14, and determines whether or not the value of the touch counter is two. If the value of the touch counter is two (YES in step S14), the controller 10 proceeds to step S15, and executes down processing for the second touch, which will be described below. If the value of the touch counter is not two (NO in step S14), or after the down processing for the first touch in step S13 has ended, or after the down processing for the second touch in step S15 has ended, the controller 10 ends the down event processing.

Down Processing for the First Touch

Figure 10:
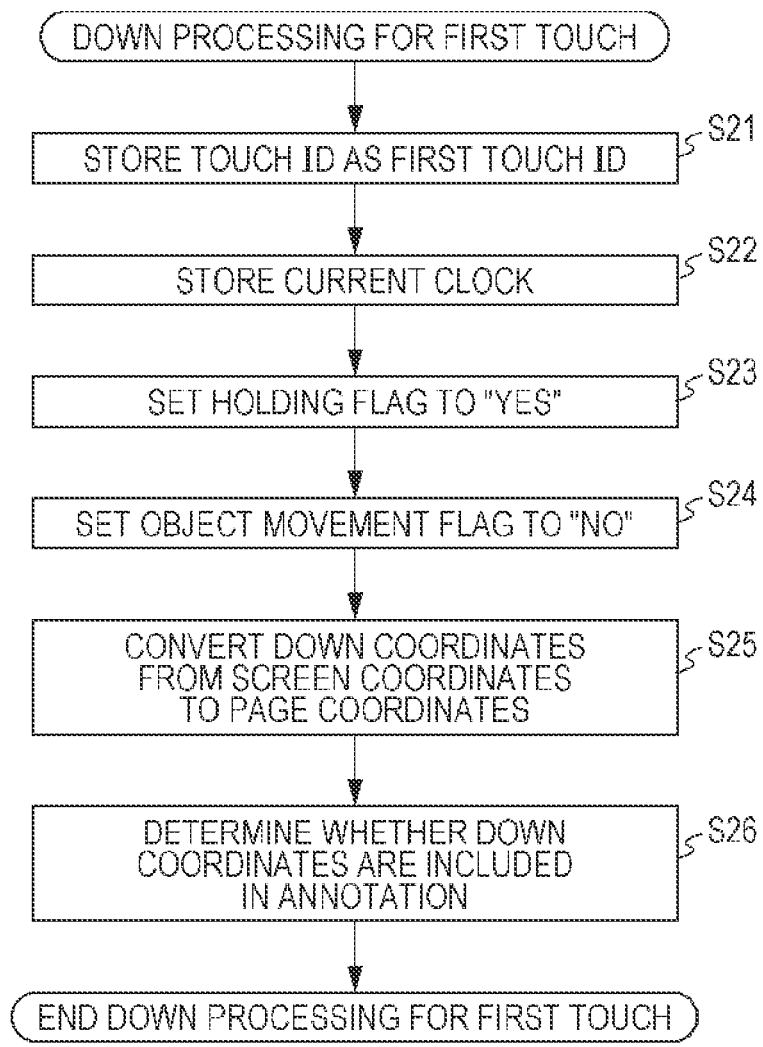
FIG. 10 is a flowchart illustrating an example of the operation of the information processing apparatus.

FIG. 10 is a flowchart illustrating an example of the operation of the information processing apparatus 1, describing down processing for the first touch. The controller 10 starts down processing for the first touch in step S13 in the above-described down event processing.

In step S21, the controller 10 stores a touch ID as a first touch ID. In step S22, the controller 10 stores a current clock. In step S23, the controller 10 sets a holding flag to "YES". In step S24, the controller 10 sets an object movement flag to "NO". In step S25, the controller 10 converts down coordinates from screen coordinates (coordinates in a detection region of the touch detector 3) to page coordinates (coordinates in a space displayed on the screen 21). In step S26, the controller 10 determines whether or not the down coordinates are included in an annotation. Accordingly, the down processing for the first touch ends.

Down Processing for the Second Touch

Figure 11:
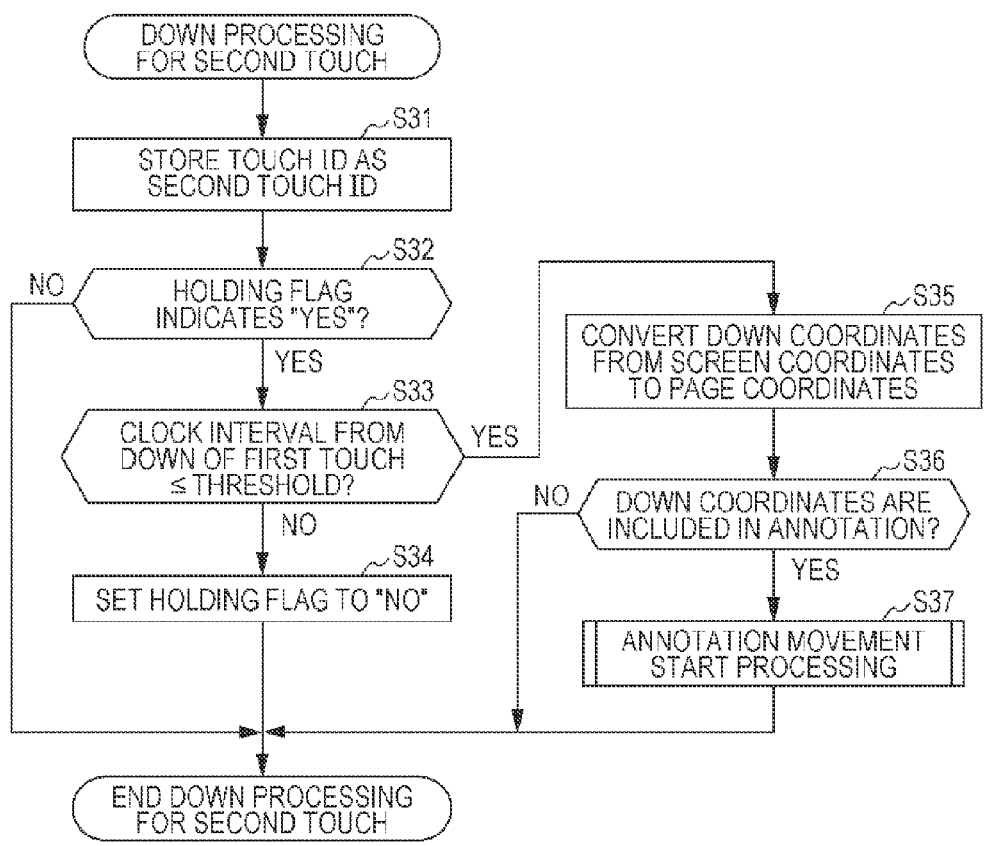
FIG. 11 is a flowchart illustrating an example of the operation of the information processing apparatus.

FIG. 11 is a flowchart illustrating an example of the operation of the information processing apparatus 1, describing down processing for the second touch. The controller 10 starts down processing for the second touch in step S15 in the above-described down event processing.

In step S31, the controller 10 stores a touch ID as a second touch ID. In step S32, the controller 10 determines whether or not the holding flag indicates "YES". If the holding flag indicates "YES" (YES in step S32), the controller 10 proceeds to step S33, and determines whether or not the clock interval from down of the first touch is smaller than or equal to a threshold.

If the clock interval from down of the first touch is smaller than or equal to the threshold (YES in step S33), the controller 10 proceeds to step S35, and converts down coordinates from screen coordinates to page coordinates. In step S36, the controller 10 determines whether or not the converted down coordinates are included in the annotation 8. If the converted down coordinates are included in the annotation 8 (YES in step S36), the controller 10 proceeds to step S37, executes annotation movement start processing which will be described below, and ends the down processing for the second touch.

If the clock interval from down of the first touch is not smaller than or equal to the threshold (NO in step S33), the controller 10 proceeds to step S34, sets the holding flag to "NO", and ends the down processing for the second touch. Also, if the holding flag does not indicate "YES" (NO in step S32), or if the converted down coordinates are not included in the annotation 8 (NO in step S36), the controller 10 ends the down processing for the second touch.

Annotation Movement Start Processing

Figure 12:
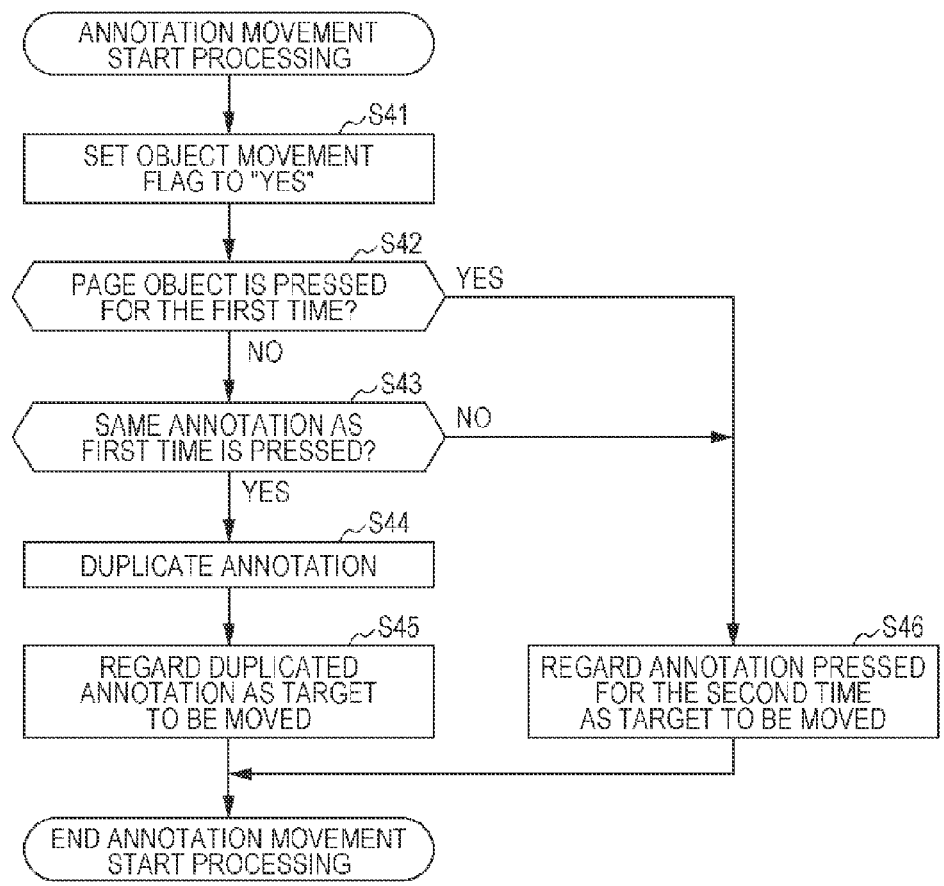
FIG. 12 is a flowchart illustrating an example of the operation of the information processing apparatus.

FIG. 12 is a flowchart illustrating an example of the operation of the information processing apparatus 1, describing annotation movement start processing. The controller 10 starts annotation movement start processing in step S37 in the above-described down processing for the second touch.

In step S41, the controller 10 sets the object movement flag to "YES". In step S42, the controller 10 determines whether or not the page object 6 is pressed for the first time. If the page object 6 is not pressed for the first time (NO in step S42), the controller 10 proceeds to step S43, and determines whether or not the same annotation 8 as the first time is pressed.

If the page object 6 is pressed for the first time (YES in step S42), or if the same annotation 8 as the first time is not pressed (NO in step S43), the controller 10 proceeds to step S46, regards the annotation pressed for the second time as a target to be moved, and ends the annotation movement start processing.

If the same annotation 8 as the first time is pressed (YES in step S43), the controller 10 duplicates the annotation 8. In step S45, the controller 10 regards the duplicated annotation as a target to be moved, and ends the annotation movement start processing.

Move Event Processing

Figure 13:
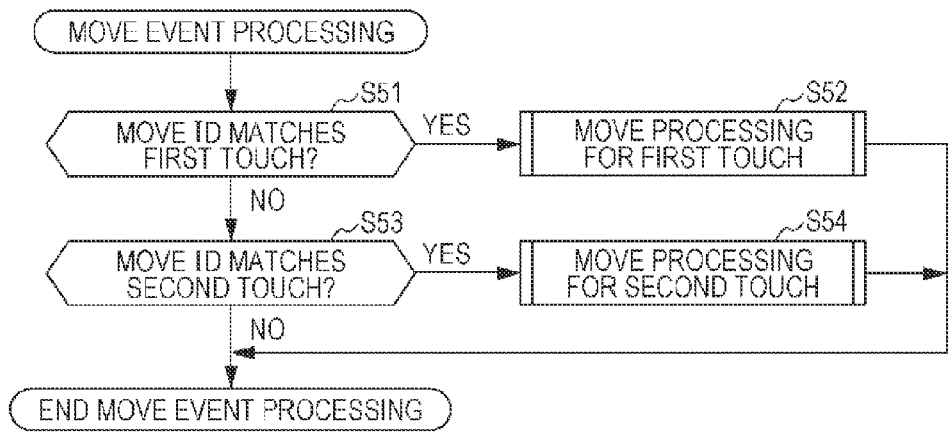
FIG. 13 is a flowchart illustrating an example of the operation of the information processing apparatus.

FIG. 13 is a flowchart illustrating an example of the operation of the information processing apparatus 1, describing move event processing. The controller 10 stats move event processing when a move event occurs.

In step S51, the controller 10 determines whether or not a move ID matches the first touch. If the move ID matches the first touch (YES in step S51), the controller 10 proceeds to step S52, and executes move processing for the first touch, which will be described below.

If the move ID does not match the first touch (NO in step S51), the controller 10 proceeds to step S53, and determines whether or not the move ID matches the second touch. If the move ID matches the second touch (YES in step S53), the controller 10 proceeds to step S54, and executes move processing for the second touch, which will be described below.

If the move ID does not match the second touch (NO in step S53), or after the move processing for the first touch in step S52 has ended, or after the move processing for the second touch in step S54 has ended, the controller 10 ends the move event processing.

Move Processing for the First Touch

Figure 14:
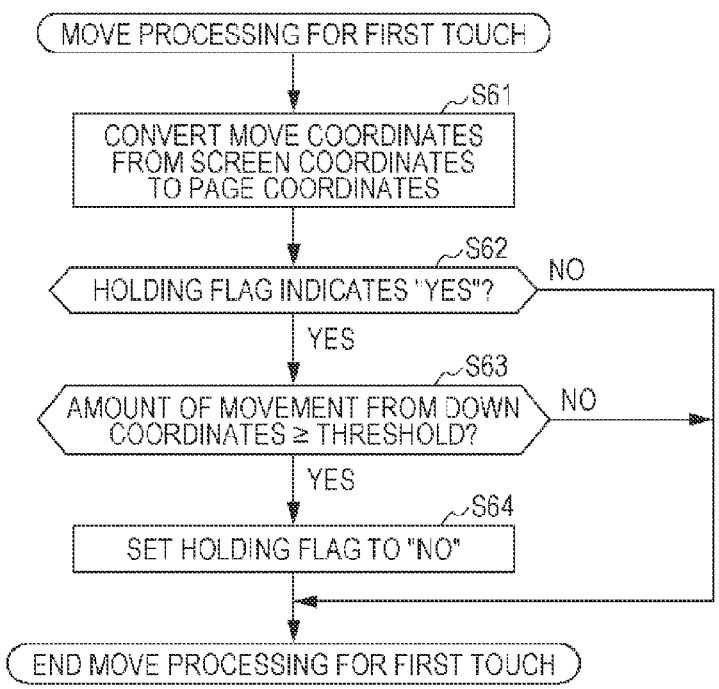
FIG. 14 is a flowchart illustrating an example of the operation of the information processing apparatus.

FIG. 14 is a flowchart illustrating an example of the operation of the information processing apparatus 1, describing move processing for the first touch. The controller 10 starts move processing for the first touch in step S52 in the above-described move event processing.

In step S61, the controller 10 converts move coordinates from screen coordinates to page coordinates. In step S62, the controller 10 determines whether or not the holding flag indicates "YES". If the holding flag indicates "YES" (YES in step S62), the controller 10 proceeds to step S63, and determines whether or not the amount of movement from the down coordinates is larger than or equal to a threshold. If the amount of movement from the down coordinates is larger than or equal to the threshold (YES in step S63), the controller 10 proceeds to step S64, sets the holding flag to "NO", and ends the move processing for the first touch.

Also, if the holding flag indicates "NO" (NO in step S62), or if the amount of movement from the down coordinates is not larger than or equal to the threshold (NO in step S63), the controller 10 ends the move processing for the first touch.

Move Processing for the Second Touch

Figure 15:
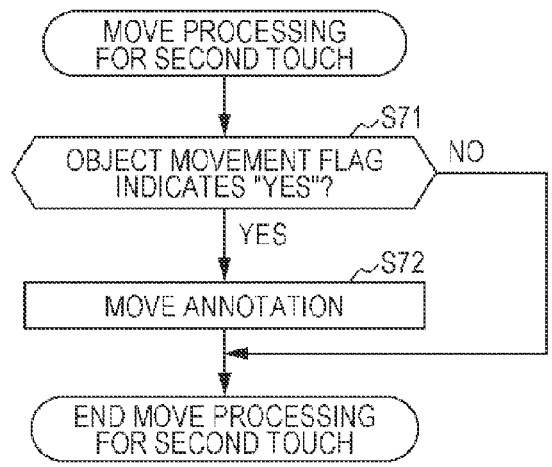
FIG. 15 is a flowchart illustrating an example of the operation of the information processing apparatus.

FIG. 15 is a flowchart illustrating an example of the operation of the information processing apparatus 1, describing move processing for the second touch. The controller 10 starts move processing for the second touch in step S54 in the above-described move event processing.

In step S71, the controller 10 determines whether or not the object movement flag indicates "YES". If the object movement flag indicates "YES" (YES in step S71), the controller 10 proceeds to step S72, moves the annotation 8, and ends the movement processing for the second touch. Also, if the object movement flag does not indicate "YES" (NO in step S71), the controller 10 ends the move processing for the second touch.

Up Event Processing

Figure 16:
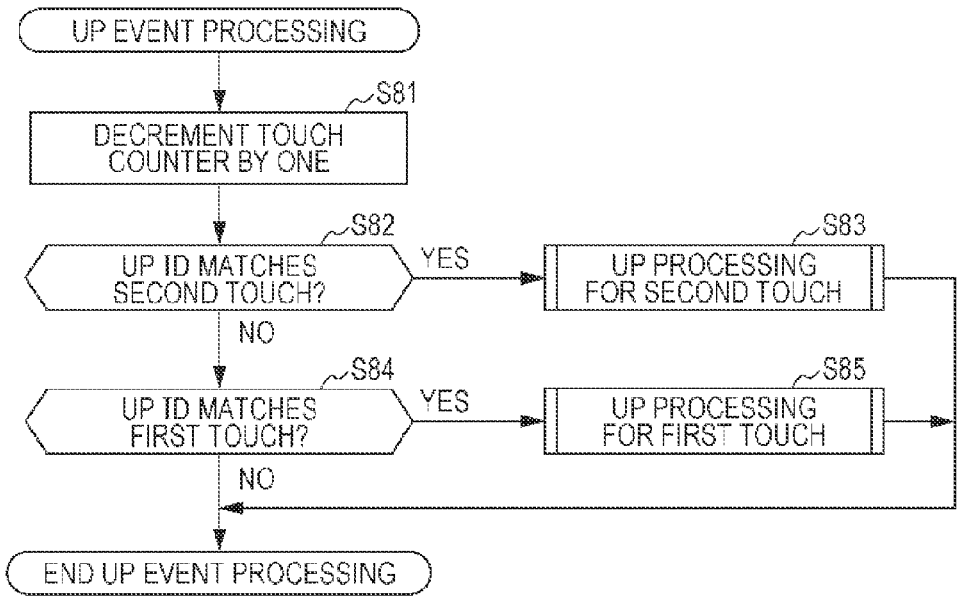
FIG. 16 is a flowchart illustrating an example of the operation of the information processing apparatus.

FIG. 16 is a flowchart illustrating an example of the operation of the information processing apparatus 1, describing up event processing. The controller 10 starts up event processing when an up event occurs.

In step S81, the controller 10 decrements the touch counter by one. In step S82, the controller 10 determines whether or not an up ID matches the second touch. If the up ID matches the second touch (YES in step S82), the controller 10 proceeds to step S83, and executes up processing for the second touch, which will be described below.

If the up ID does not match the second touch (NO in step S82), the controller 10 proceeds to step S84, and determines whether or not the up ID matches the first touch. If the up ID matches the first touch (YES in step S84), the controller 10 proceeds to step S85, and executes up processing for the first touch, which will be described below.

If the up ID does not match the first touch (NO in step S84), or after the up processing for the second touch in step S83 has ended, or after the up processing for the first touch in step S85 has ended, the controller 10 ends the up event processing.

Up Processing for the Second Touch

Figure 17:
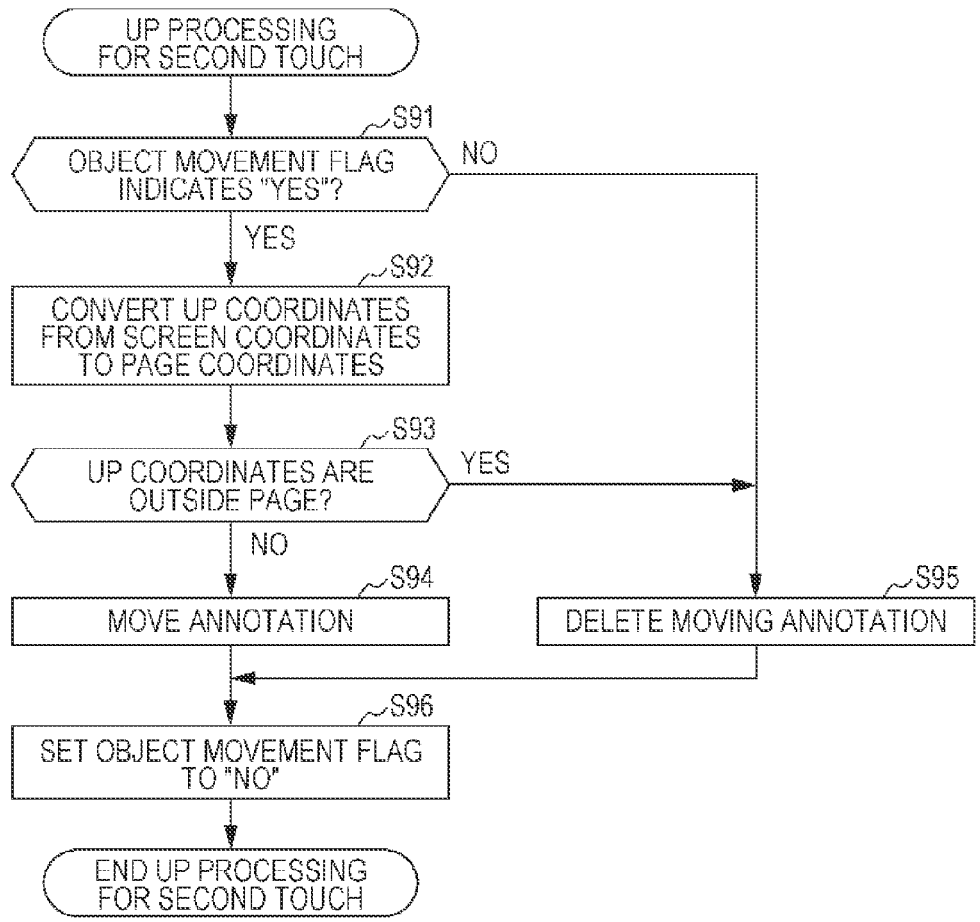
FIG. 17 is a flowchart illustrating an example of the operation of the information processing apparatus.

FIG. 17 is a flowchart illustrating an example of the operation of the information processing apparatus 1, describing up processing for the second touch. The controller 10 starts up processing for the second touch in step S83 in the above-described up event processing.

In step S91, the controller 10 determines whether or not the object movement flag indicates "YES". If the object movement flag indicates "YES" (YES in step S91), the controller 10 proceeds to step S92, and converts up coordinates from screen coordinates to page coordinates. In step S93, the controller 10 determines whether or not the up coordinates are outside the page. If the up coordinates are not outside the page (NO in step S93), the controller 10 proceeds to step S94, and moves the annotation 8.

If the object movement flag does not indicate "YES" (NO in step S91), or if the up coordinates are outside the page (YES in step S93), the controller 10 proceeds to step S95, and deletes the annotation 8 which is being moved.

After the annotation 8 is moved in step S94, or after the annotation 8 which is being moved is deleted in step S95, the controller 10 proceeds to step S96, sets the object movement flag to "NO", and ends the up processing for the second touch.

Up Processing for the First Touch

Figure 18:
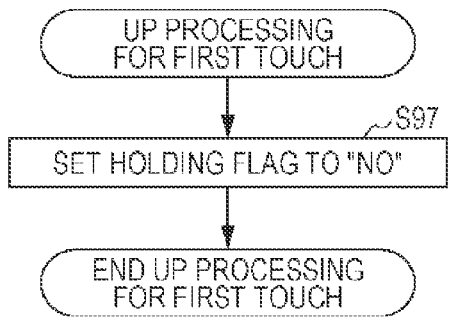
FIG. 18 is a flowchart illustrating an example of the operation of the information processing apparatus.

FIG. 18 is a flowchart illustrating an example of the operation of the information processing apparatus 1, describing up processing for the first touch. The controller 10 starts up processing for the first touch in step S85 in the above-described up event processing.

In step S97, the controller 10 sets the holding flag to "NO", and ends the up processing for the first touch.

An exemplary embodiment of the present invention has been described above. The present invention is not limited to the above-described exemplary embodiment, and of course various modifications may be made by those skilled in the art.

Figure 19:
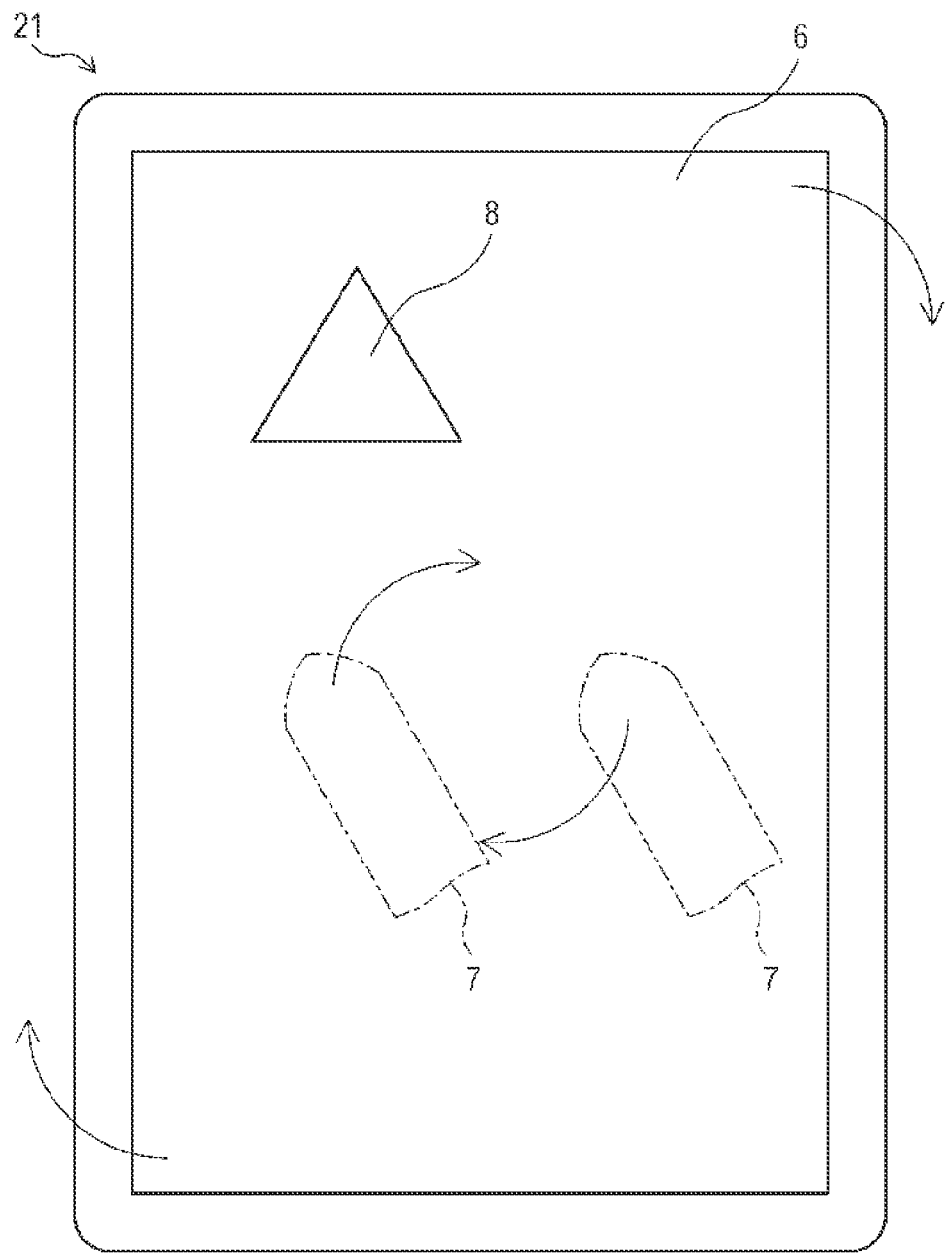
FIG. 19 is a diagram illustrating an example of display on the screen.
Figure 20:
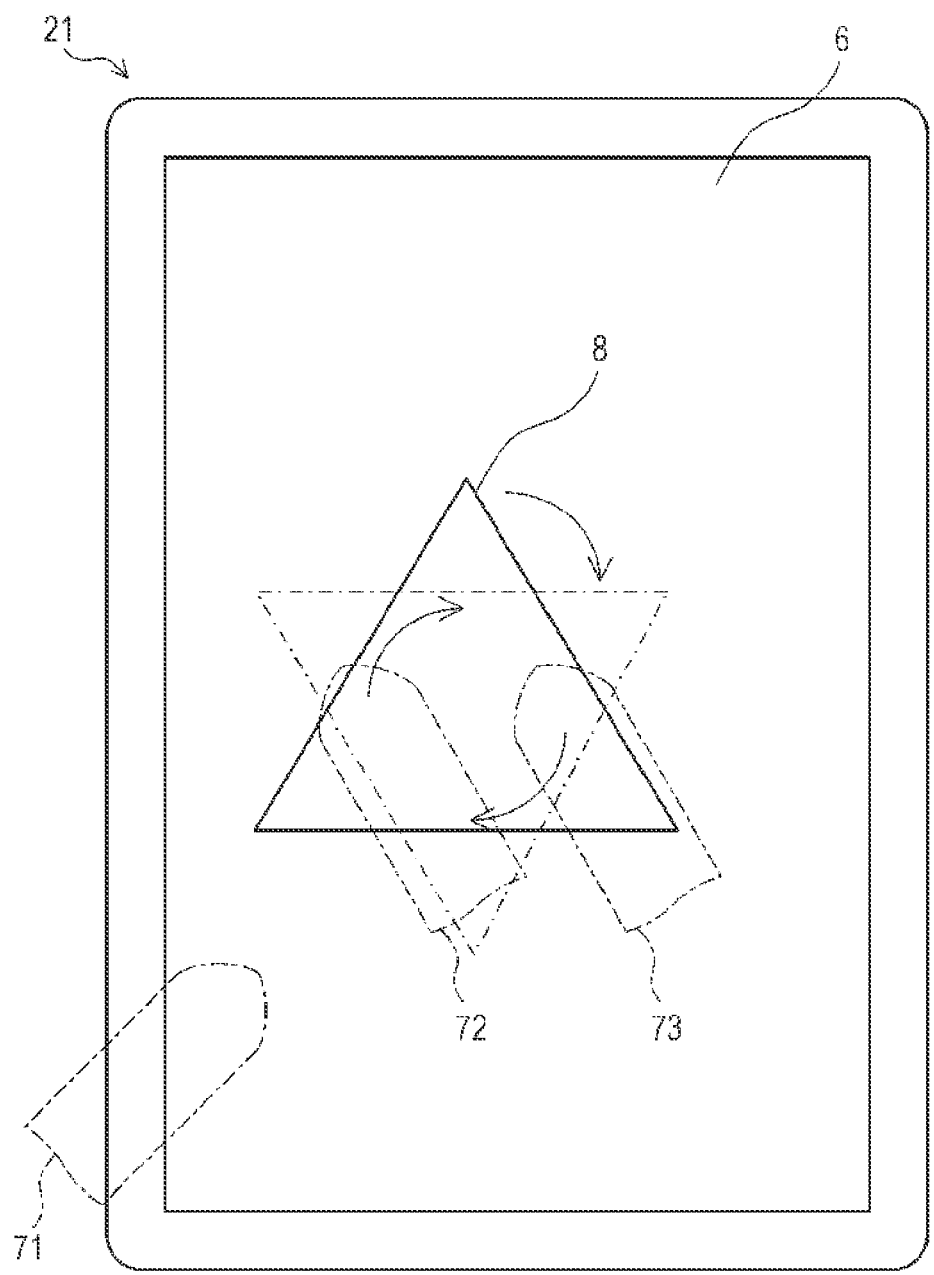
FIG. 20 is a diagram illustrating an example of display on the screen.

For example, a viewing operation and an editing operation may be associated with rotation of two touch positions. In the viewing operation illustrates in FIG. 19, when the user rotates the touch positions of two fingers 7 which are in touch with the screen 21, the page object 6 is rotated together with the annotation 8 in the same direction within the screen 21 (the function of the display region changing unit 103). Rotation of the page object 6 is performed in units of 90 degrees, for example. On the other hand, in the editing operation illustrated in FIG. 20, when the user touches a portion other than the annotation 8 (for example, a portion on the page object 6) on the screen 21 with the first finger 71 and rotates the touch positions of the second and third fingers 72 and 73 on the annotation 8 while maintaining the touch position of the first finger 71, only the annotation 8 is rotated in the same direction on the page object 6 (the function of the editing execution unit 104). The amount of rotation of the annotation 8 is determined in accordance with the amount of rotation of the two touch positions. The rotation of the two touch positions is detected, for example, in a case where a line segment connecting the two touch positions and a movement component orthogonal thereto are opposite to each other.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display;
a detector configured to detect a plurality of touches made by an indicator on a screen of the display;
a display controller configured to cause the screen to display a page of a document and an annotation, the annotation being arranged on the page of the document; and
an editing execution unit configured to edit the annotation after a first touch position and a second touch position have been detected, and while the first touch position is maintained, execute editing associated with the annotation,
wherein if the first touch position is on the page and the second touch position moves from a position on the annotation to a certain position outside the annotation, the editing execution unit moves the annotation to the certain position, and
wherein if the first touch position is on the annotation and the second touch position moves from the position on the annotation to a certain position outside the annotation, the editing execution unit duplicates the annotation at the certain position.

2. The information processing apparatus according to claim 1,
wherein, after the first touch position has been detected at a position on the page and the second touch position moves from a position on the annotation to a predetermined position outside the annotation with the first touch position being maintained, the editing execution unit deletes the annotation to the certain position.

3. The information processing apparatus according to claim 1,
wherein the editing execution unit stops editing the annotation in response to the first touch position being not detected before editing of the annotation has been completed.

4. The information processing apparatus according to claim 1,
wherein, after the first touch position has been detected at a position on the page, and in response to the second touch position and a third touch position being rotated on the annotation with the first touch position being maintained, the editing execution unit rotates the annotation.

5. An information processing method comprising:
detecting a plurality of touches made by an indicator on a screen of a display;
causing the screen to display a page of a document and an annotation, the annotation being arranged on the page of the document; and
editing the annotation after a first touch position and a second touch position have been detected and while the first touch position is maintained,
wherein if the first touch position is on the page and the second touch position moves from a position on the annotation to a certain position outside the annotation, the editing moves the annotation to the certain position, and
wherein if the first touch position is on the annotation and the second touch position moves from the position on the annotation to a certain position outside the annotation, the editing duplicates the annotation at the certain position.

6. A non-transitory computer readable medium storing a program causing a computer to execute a process, the process comprising:
detecting a plurality of touches made by an indicator on a screen of a display;
causing the screen to display a page of a document and an annotation, the annotation being arranged on the page of the document; and
editing the annotation after a first touch position and a second touch position have been detected and while the first touch position is maintained,
wherein if the first touch position is on the page and the second touch position moves from a position on the annotation to a certain position outside the annotation, the editing moves the annotation to the certain position, and
wherein if the first touch position is on the annotation and the second touch position moves from the position on the annotation to a certain position outside the annotation, the editing duplicates the annotation at the certain position.

7. An information processing apparatus comprising:
a touch panel configured to detect a plurality of touch positions of a finger;
a display controller configured to cause the touch panel to display a first page of document data and annotation data, the annotation data being attached to the first page of document data;
an editing execution unit configured to edit the annotation data after a first touch position and a second touch position have been detected, and while the first touch position is maintained, execute editing associated with the annotation; and
a moving unit configured to, if the first touch position is on the page and the second touch position moves from a position on the annotation to a certain position outside the annotation, move the annotation to the certain position, and if the first touch position is on the annotation and the second touch position moves from the position on the annotation to a certain position outside the annotation, duplicate the annotation at the certain position.

* * * * *